UNITED STATES PATENT OFFICE.

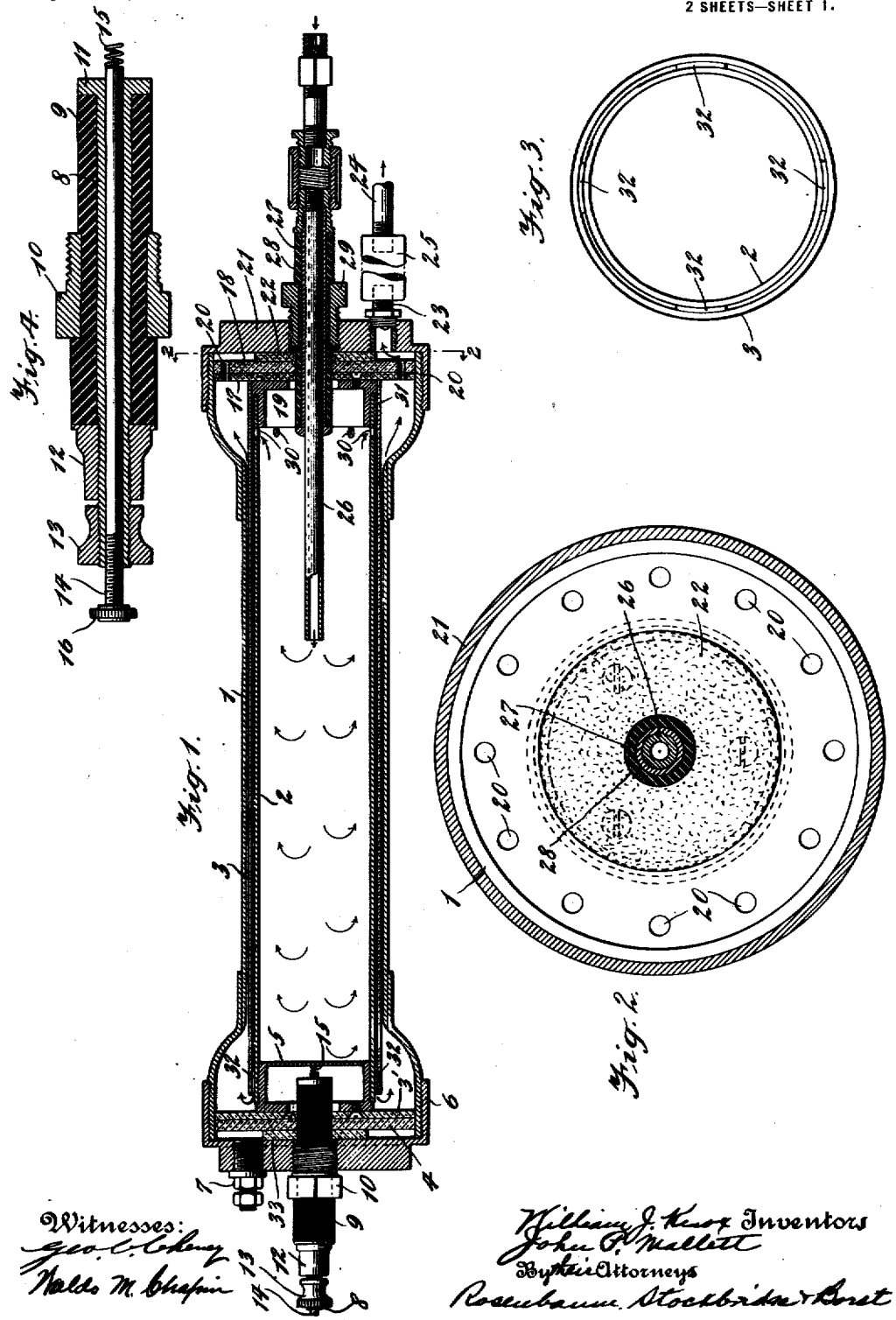

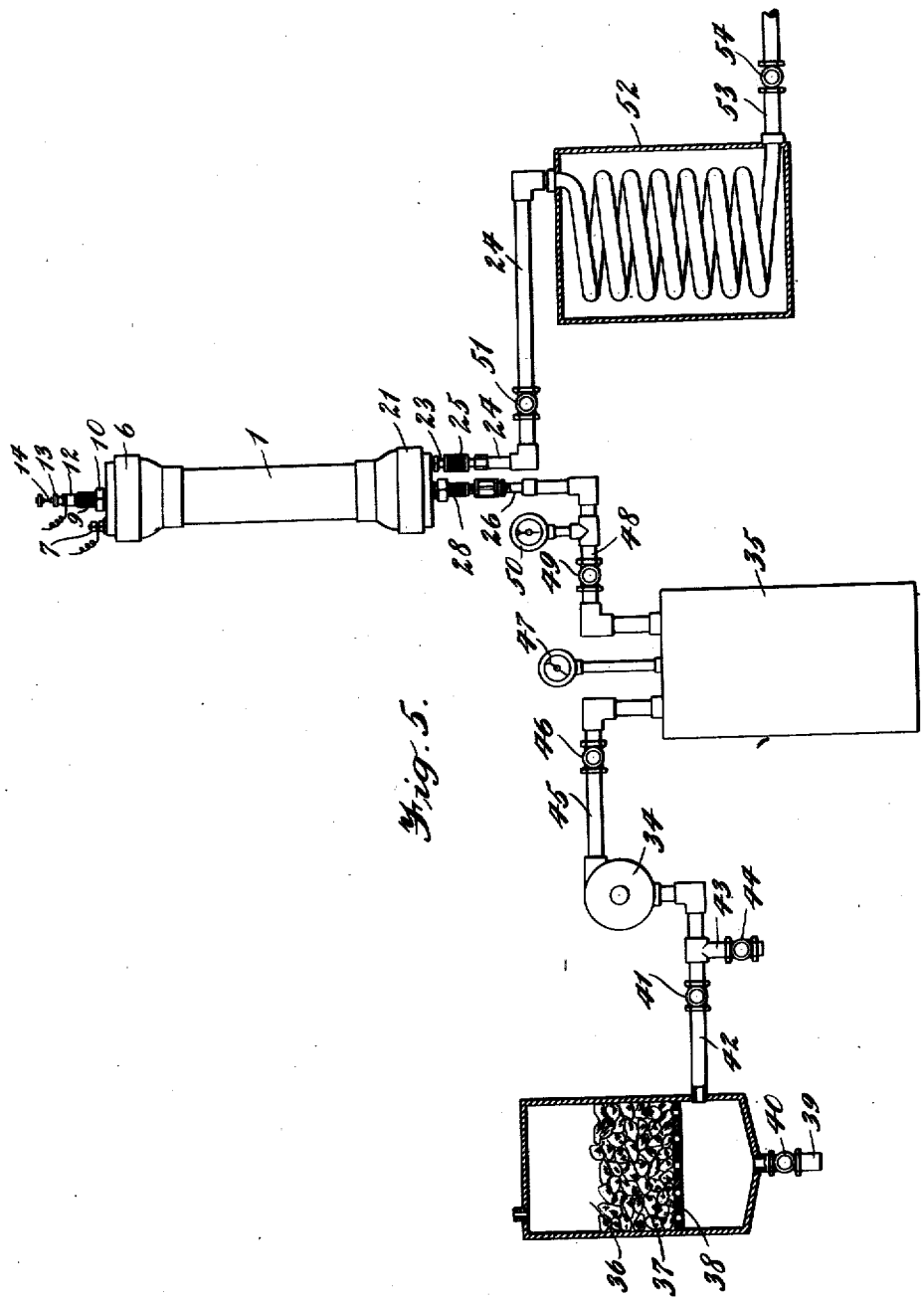

WILLIAM JOHN KNOX, OF NEW YORK, N. Y., AND JOHN P. MALLETT, OF ELIZABETH, NEW JERSEY, ASSIGNORS, BY DIRECT AND MESNE ASSIGNMENTS, TO GENERAL RESEARCH LABORATORIES, OF NEW YORK, N. Y., A CORPORATION OF NEW YORK.

APPARATUS FOR OZONE GENERATION.

1,312,484.   Specification of Letters Patent.   Patented Aug. 5, 1919.

Application filed January 31, 1914, Serial No. 815,585. Renewed October 29, 1918. Serial No. 260,211.

*To all whom it may concern:*

Be it known that we, WILLIAM J. KNOX and JOHN P. MALLETT, citizens of the United States, residing, respectively, at the city of New York, borough of Manhattan, and State of New York, and Elizabeth, in the county of Union and State of New Jersey, have invented certain new and useful Improvements in Apparatus for Ozone Generation, of which the following is a full, clear, and exact description.

Our invention relates to the art of ozone generation. One object of our invention is to provide means whereby ozone may be obtained under pressure in a stable condition. Another object is an increased efficiency in ozone production.

Heretofore it has been customary to refrigerate the oxygen containing atmosphere either before it is delivered to the ozone generator or while it is passing through the generator or both, and it has heretofore been suggested to deliver the atmosphere to the generator under pressure after subjecting it to a cooling operation.

The theory which has occasioned this practice has been that heat was inimical to ozone production, whereas we have found that it is the rarefaction of the atmosphere due to the heat which causes the lowered production of the ozone and that the diminution in ozone production is proportionate to the rarefaction; and we have found that if the rarefaction resulting from the rise of temperature be compensated for by an increase of pressure, a diminution in ozone production does not occur, and that by further increasing the pressure, thus obtaining a greater atmospheric density, the production of ozone may be still further increased on account of the increased number of oxygen molecules within the field of electric bombardment. We have found that the action within the ozone generator is one of dissociation of the oxygen molecules, and, that, if the proper density is maintained, this dissociation is increased rather than diminished by an increase of temperature, as is characteristic of all endothermic compounds.

The presence of the electrons in greatest numbers on the surfaces of the electrodes where they have their origin, and on the dielectric surfaces where they are intercepted, is taken advantage of by us in our improved method, and the ozone production is thus further increased by the bringing of all of the oxygen into intimate contact with these highly charged surfaces by passing it successively between one electrode and the adjacent dielectric surface and then between the other electrode and its adjacent dielectric surface.

In order to render the ozone stable upon its emergence from the field of electric bombardment, its molecular kinetic energy is abstracted by suddenly cooling it down to the temperature at which ozone is stable, thereby fixing or "paralyzing" it. This "paralyzing" or "stabilizing" is preferably obtained by us by simultaneously permitting the ozone atmosphere to expand and by subjecting it to a refrigerating process.

An object of our invention is convenience in assembling and accurately holding the parts in concentric relation. Another object is simplicity and effectiveness in insulating the two electrodes. Another object is to provide a tube of sufficient strength to be adaptable for use under high pressures. Other objects are simplicity and compactness of construction and economy in manufacture and maintenance. Still other objects and advantages of our invention will appear from the following description. We shall now describe the embodiment of our invention illustrated in the accompanying drawings and shall thereafter point out our invention in claims.

Figure 1 is a central longitudinal section of an ozone tube embodying our invention;

Fig. 2 is a transverse section of the same on an enlarged scale, taken on the line 2—2 and looking toward the left;

Fig. 3 is a detail end view on an enlarged scale, of the inner electrode and dielectric member, as viewed from the left of Fig. 1;

Fig. 4 is a central longitudinal section on an enlarged scale of the electrical connection to the inner electrode and the insulation therefor;

Fig. 5 is a diagrammatic view of a system including our improved tube.

The illustrated ozone tube comprises an outer cylindrical electrode 1, an inner cylindrical electrode 2 concentric therewith, and between the two and in concentric relation therewith a cylindrical dielectric member 3, preferably composed of glass.

These electrodes are sufficiently thick to provide enough material to readily absorb the heat from any point having a tendency to heat up, and for this purpose we have found that electrodes having a minimum thickness of about one-sixteenth of an inch is satisfactory in most cases. Tubes of such thickness furthermore have the advantage that they have sufficient rigidity to maintain their true cylindrical shape and withstand the high pressures to which they may be subjected in use and are not distorted or bent under the exigencies of use.

The air gap between the two electrodes is increased at the ends of the tube to prevent the passage of electrical discharge between the electrodes at the ends, and in the form shown, the air gap is increased by enlarging or expanding the ends of the outer electrode. For convenience of manufacture these expanded or enlarged ends of the outer electrode may be made separately and soldered or otherwise secured on to the main body of the electrode, as shown.

To facilitate the assembling of the members and provide for the accurate and ready centering of the electrodes, end closures are provided which are composed of insulating disks accurately fitting within the expanded ends of the outer electrode and having central concentric hub portions which fit into the respective ends of the inner electrode and support it in the proper concentric relation. In the illustrated embodiment, the air inlet and outlet connections are both provided on one end of the tube and the two electrical connections are provided on the other end of the tube.

For the end of the tube on which the electrical connections are provided, the insulating disk closure comprises two similar component disks 3' and 4, composed of suitable insulating material such as fiber or glass, secured together, face to face, as by a suitable cement, and fitting within the expanded end of the outer electrode 1, and the inner disk 3' has secured thereto, as by screws, a metallic hub portion 5, which is concentrically arranged and of the proper size to fit snugly into the end of the inner electrode 2. The two disks 3' and 4 are provided with a central opening, as shown. It will be noted that the outer disk 4 serves as an insulating protector for the outer end of the screws.

The expanded end of the outer electrode is provided with external screw-threads, and a metallic cap 6 is screwed upon this end and forms a part of the outer electrode, and this removable cap carries the electrical connections for the two electrodes. The electrical connection to the outer electrode consists merely of a suitable binding-post 7 on the outer face of the cap, and secured in a central opening in the cap and carried thereby is the electrical connection for the inner electrode. This connection for the inner electrode, which is shown in detail in Fig. 4, comprises a central longitudinal tube 8 of conductive material projecting inwardly through the central opening in the insulating disks 3' and 4 and is surrounded for a substantial portion of its length by an insulating material 9; a nut 10 having external threads being secured upon the insulation 9 as shown, which nut engages in the screw-threads in the central opening of the cap and holds the tube in place. The insulating material 9 may be made of mica-rings or washers and be compressed between the head 11 on one end of the tube 8, and a nut 12 on the other end which engages external screw-threads on the tube. A binding-nut 13 also engages the screw-threads upon the tube 8 and coöperates with the nut 12 to form a binding-post. To make electrical connection with the inner electrode, a metallic rod 14 is provided which extends through the hollow tube 8 in contact therewith and has a spring extension 15 on its inner end arranged to engage the inner closed end of the hub 5 and thereby make electrical connection with the inner tube. This rod 14 is provided at its outer end with screw-threads which engage in internal screw-threads in the outer end of the tube 8, and has on its outer end a knurled head 16 for convenience in manually adjusting the rod to effect the connection.

The closure for the other end of the tube is substantially similar to that just described. The insulating disk is similarly composed of an inner component disk 17 and an outer component disk 18, and fits into the expanded end of the outer tube, and the inner component disk carries a concentric hub portion 19 which fits into and supports that end of the inner electrode in proper concentric relation. The insulating disk, however, is provided near its periphery with a plurality of perforations 20, and the insulating disk is spaced from the cap 21 on the end of the outer electrode by a suitable packing ring or washer of felt or other suitable material 22, thereby providing an annular air outlet space, with which the perforations 20 communicate. The cap 21 carries the air connections, the air outlet comprising a hollow nipple 23 which communicates with the annular air outlet space between the cap and the insulating disk, and this nipple is connected to the outlet pipe 24, preferably by an insulating coupling 25 of hard rubber or other suitable material in order to properly insulate the tube at this point.

The air inlet construction corresponds to the electrical construction for the inner electrode carried by the cap 6 and is very similar in construction thereto. The inlet pipe 26 fits within a tube 27 on which is provided the insulation 28, which carries the nut 29 secured in the central opening in the cap 21, and the inlet pipe 26 is suitably coupled at its outer end to the source of air supply. The tube 27 and the insulation thereon extend inwardly through the central opening in the insulating disk, and the hub 19, unlike the hub 5, is open on its inner end and the inlet pipe 26 extends well into the interior of the inner electrode, as shown.

The packing ring or washer 22 closely surrounds the air inlet member and prevents the leakage of air through the central opening in the insulating disk to the annular air outlet space. It will be noted that this air inlet member is completely insulated from the outer electrode, and the tube is therefore suitably insulated at this point.

The parts are so constructed that circulation is directed, first, underneath the dielectric member 3, and then in a reverse direction over the dielectric member 3. For this purpose the inner electrode 2 is provided at the air inlet end just inside of the hub 19 with a plurality of radial openings 30, and a sealing ring 31 of soft packing material, such as asbestos, is provided between the inner electrode and the dielectric member 3 at this end of the inner electrode just back of the openings 30 and serves to seal this space with respect to the space between the dielectric member and the outer electrode, and this sealing ring also serves to support the dielectric member in substantially concentric relation to the inner electrode. At its opposite end the dielectric member is supported by a plurality of soft spaced pads or wedges 32 which also serve to support the dielectric member at that end in substantially concentric relation to the inner electrode while permitting free communication at that end between the inner and outer annular air spaces on the opposite sides of the dielectric member. It will be noted that the character of the spacing between the glass dielectric member and the inner electrode is such that, while it maintains the dielectric member in substantially concentric relation, it will permit the dielectric member to contract and expand independently of the supporting electrode.

Due to the extension of the inlet pipe 26 some distance into the inner electrode, and the force under which the air is delivered to the tube, the air is projected well toward the opposite closed end of the inner electrode, and it returns over the inner surface of the electrode and passes outwardly through the openings 30 in the annular space between the inner electrode and the dielectric member 3. Since the sealing ring 31 seals the space at this end, the air is forced to pass through this annular space in intimate contact with the outer surface of the inner electrode and the inner surface of the dielectric member for their entire length, and then passes around the end of the dielectric member 3 and back through the annular space outside the dielectric member in intimate contact with its outer surface and with the inner surface of the outer electrode, and thence through the openings 20 into the annular air outlet space inside the cap 21, and thence through the air outlet nipple 23 to the air outlet connection.

This method of circulating the air through the tube serves to equally distribute the heat generated in the tube and to maintain all parts of the tube at substantially uniform temperature. Furthermore, the passage of the air into intimate contact with all four of the highly charged surfaces serves to effect a maximum dissociation of the oxygen molecules.

Since the insulating disks which serve as closures for the ends of the tube and their supporting hubs are all carefully machined to a common center, and are accurately fitted to the diameter of the outer and inner electrodes, respectively, the parts may be conveniently and accurately assembled in concentric relation. As shown, the hubs 5 and 19 may be provided with annular shoulders to limit their movement into the ends of the inner tube, and they form with the inner tube an integral unit which may be adjusted longitudinally as a whole, and which fits into the outer electrode in accurate concentric relation. The proper longitudinal position of this unit is determined by the packing ring 22, and any looseness may be taken up by a similar packing ring 33 at the opposite end of the tube. The closure at either end of the tube may be removed and the parts replaced without necessitating the removal of the closure at the other end of the tube. It will be observed that the parts are all easily and conveniently assembled with slip-joints, and require no skill in assembling, and that there is an entire absence of soldered or other rigid joints between the separate members.

In Fig. 5 we have illustrated diagrammatically an apparatus including our improved tube for generating ozone. The electrical connections are shown, but the source of electrical energy is omitted, it being understood that current is supplied from the secondary of a transformer in the usual way. In practice, we employ a current having a pressure of from 8,000 to 12,000 volts.

Air is fed in the system by a suitable fan or pump 34, which is arranged in the system between the storage tank 35 and the drying chamber 36. This drying chamber contains a suitable hygroscopic material 37, such as fused calcium chlorid, and is arranged at the entrance to the system, air being drawn downwardly into the drying chamber through an opening in the top, and passing through the drying agent which is supported on a perforated transverse partition 38. The drying chamber is provided at its bottom with a drain pipe 39 controlled by a valve 40.

The valve 41 is provided in the pipe 42 between the fan and the drying chamber, and a branch pipe 43 controlled by a valve 44 is arranged in front of the valve 41 and, if desired, the valve 41 may be closed and the valve 44 opened and the air taken directly into the fan without drying.

From the fan 34 the air is delivered through the pipe 45, past the controlling valve 46 in the storage tank 35, where it is stored under pressure, which pressure is indicated by the pressure-gage 47 on the tank. From the storage tank 35, the air is delivered through the pipe 48 to the inlet pipe 26 of the ozone tube, and this pipe 48 is controlled by a regulating valve 49, which is set to deliver the air to the tube at the desired pressure. This pressure is indicated by a pressure-gage 50 on the pipe 48 in front of the regulating valve 49.

Upon emerging from the ozone tube through the outlet pipe 24, the ozonized air passes a throttling valve 51 in the outlet pipe which maintains the desired pressure in the ozone tube, and upon its passage through this throttling valve 51, the ozonized air is immediately permitted to expand, and at the same time it passes into a refrigerating device 52, and the ozonized air is thereby suddenly cooled down to the temperature at which ozone is stable. As previously stated, this sudden cooling serves to "paralyze" or "stabilize" the ozone.

After the ozone is thus rendered stable, the ozonized air passes through the pipe 53, past the controlling valve 54, to its place of storage or ultimate use. The ozonized air is still under pressure sufficient to deliver it through a piping system to one or various points of use, and our system may therefore be utilized for the generation of ozone for commercial use on a large scale. For instance, it can be delivered through a building and used for sterilizing water at different points, or it may be delivered to various points for any use desired. It is evident that one or more ozone tubes may be used in a system, and this system may be used for the continuous generation of ozone and delivery to the desired place.

It is obvious that various modifications may be made in the construction of our apparatus as illustrated in the drawings and above particularly described, within the principle and scope of our invention.

We claim:—

1. A system for generating ozone comprising a pressure storage tank, a compressor arranged to deliver oxygen containing atmosphere to the tank under pressure, an ozone tube, a conduit connecting the storage tank to the inlet pipe of the ozone tube, a refrigerating device, and a conduit connecting the refrigerating device with the outlet pipe of the ozone tube.

2. A system for generating ozone comprising a pressure storage tank, a compressor arranged to deliver oxygen containing atmosphere to the tank under pressure, an ozone tube, a conduit connecting the storage tank to the inlet pipe of the ozone tube, a refrigerating device, a conduit connecting the refrigerating device with the outlet pipe of the ozone tube, and a throttling valve in the latter conduit.

3. In an ozone tube, an inner and an outer cylindrical metallic electrode inclosing an annular air space between them, and a disk of insulating material at one end of the tube fitting into the outer electrode and having a hub portion fitting into the inner electrode.

4. In an ozone tube, an inner and an outer cylindrical concentric metallic electrode inclosing an annular air space between them, the inner electrode being shorter than the outer electrode, and for each end of the tube a centering disk of insulating material fitting within the outer electrode and having a hub portion fitting into the inner electrode.

5. In an ozone tube, an inner and an outer cylindrical concentric metallic electrode inclosing an annular air space between them, the width of the air space being increased at the ends of the electrode, and for each end of the tube a centering disk of insulating material fitting within the outer electrode and supporting the inner electrode.

6. In an ozone tube, an inner and an outer cylindrical concentric metallic electrode, the outer electrode having its ends of substantially enlarged diameter, and the inner electrode having its ends extending within the enlarged ends of the outer electrode, and for each end of the tube an insulating disk fitting into the enlarged end of the outer tube and having a concentric hub portion fitting within and supporting the inner tube.

7. An ozone tube comprising two concentric cylindrical electrodes, an interposed concentric dielectric member, the inner electrode having its ends closed and provided with openings at one end communicating with the space between the inner electrode and the dielectric member, this place being sealed at the same end outside of the openings with respect to the space between the dielectric member and the outer electrode, closures for the ends of the tube, an air inlet communicating with the interior of the inner electrode, and an air outlet communicating with the space between the dielectric member and the outer electrode, whereby circulation is provided, first through the interior of the inner electrode then through the space between the inner electrode and the dielectric member and then in a reverse direction through the space between the outer electrode and dielectric member.

8. An ozone tube comprising two concentric cylindrical electrodes and an interposed concentric dielectric member, a closure for one end of the tube, and a closure for the opposite end of the tube having a central air inlet tube extending well within the inner electrode and having an air outlet communicating with the space between the dielectric member and the outer electrode, the inner electrode being provided at the air inlet end with openings communicating with the space between the dielectric member and the inner electrode, this space being sealed at this end outside of the openings with respect to the space between the dielectric member and the outer electrode, whereby circulation is provided within the inner electrode and through the perforations therein, thence through the annular space between the outer surface of the inner electrode and the inner surface of the dielectric member, and thence back through the annular space between the outer electrode and the outer surface of the dielectric member and thence through the air outlet.

9. In an ozone tube, two concentric cylindrical electrodes, for one end a closure comprising a disk of insulating material fitting within the end of the outer electrode and having a central opening and a concentric hub portion fitting within and supporting the inner electrode, a removable metallic cap for the end of the outer electrode, a hollow insulating member carried by the cap and extended through the perforation in the insulating disk, and an electrical conductor extending through the hollow insulating member and making electrical contact with the inner electrode.

10. In an ozone tube, two concentric cylindrical electrodes, for one end a closure comprising a disk of insulating material fitting within the end of the outer electrode and having a central opening and a concentric metallic hub portion fitting within and supporting the inner electrode, a removable metallic cap for the end of the outer electrode, a hollow insulating member carried by the cap and extending through the perforation in the insulating disk, and an electrical conductor extending through the hollow insulating member and making electrical contact with the metallic hub portion.

11. In an ozone tube, two concentric cylindrical electrodes, the inner electrode being perforated near one end, and a closure for one end of the tube comprising a disk of insulating material fitting within the end of the outer electrode and provided with perforations therethrough communicating with the space between the two electrodes and having a central opening and a concentric hub fitting into and supporting the inner electrode, a removable cap fitting upon the outer electrode, a central air inlet tube carried by the cap and extending through the central opening in the insulating disk of the inner electrode, and an air outlet tube communicating with the perforations through the insulating disk.

12. In an ozone tube, two concentric cylindrical electrodes, the inner electrode being perforated near one end, and a closure for one end of the tube comprising a disk of insulating material fitting within the end of the outer electrode and provided with perforations therethrough communicating with the space between the two electrodes and having a central opening and a concentric hub fitting into and supporting the inner electrode, a removable cap fitting upon the outer electrode, a central air inlet tube carried by the cap and extending through the central opening in the insulating disk of the inner electrode, an air outer tube communicating with the perforations through the insulating disk, and a packing of cushioning material interposed between the insulating disk and the cap and surrounding the air inlet tube.

13. In an ozone tube, two concentric cylindrical electrodes, the inner electrode being perforated near one end, and a closure for one end of the tube comprising a disk of insulating material fitting into the end of the outer electrode and provided with perforations therethrough communicating with the space between the two electrodes and having a central opening and a concentric hub fitting into and supporting the inner electrode, a removable cap fitting upon the outer electrode, a central air inlet tube carried by the cap and insulated therefrom and extending through the central opening in the insulating disk of the inner electrode, and an air outlet tube insulated from the cap and communicating with the perforations through the insulating disk.

14. In an ozone tube, two concentric cylindrical electrodes, the inner electrode being perforated near one end, a closure for one end of the tube comprising a disk of insulating material fitting within the end of the outer electrode and provided with perforations therethrough communicating with the space between the two electrodes and having a central opening and a concentric hub portion fitting into and supporting the inner electrode, a removable cap fitting upon the outer electrode, a central air inlet tube carried by the cap and extending through the central opening in the insulating disk of the inner electrode, and an air outlet tube communicating with the perforations through the insulating disk; and a closure for the other end of the tube comprising a disk of insulating material fitting within that end of the outer electrode and having a central opening and a concentric hub portion fitting within and supporting the inner electrode, a removable metallic cap for that end of the electrode, a hollow insulating member carried by the cap and extending through the perforations in the insulating disk, and an electrical conductor extending through the hollow insulating member and making electrical contact with the inner electrode.

15. In an ozone tube, an inner cylindrical electrode member, a cylindrical dielectric member surrounding the electrode member, a packing and sealing ring of soft material surrounding one end of the electrode member and supporting and spacing the dielectric member and sealing the space between the two members at that end, and a plurality of soft pads spaced apart and interposed between the two members at the other end and supporting and spacing the dielectric member at that end, whereby the dielectric member is free to expand and contract independently.

16. An ozone generating system comprising an ozone tube, a compressor arranged to deliver oxygen containing atmosphere to the tube under pressure, and a cooling agency connected to the outlet pipe of the ozone tube and arranged to receive the ozonized atmosphere.

In witness whereof we subscribe our signatures in the presence of two witnesses.

WILLIAM JOHN KNOX.
JOHN P. MALLETT.

Witnesses:
VICTOR D. BOND,
WALDO M. CHAPIN.